(12) United States Patent
Moore et al.

(10) Patent No.: US 7,188,699 B2
(45) Date of Patent: Mar. 13, 2007

(54) AXLE ASSEMBLY WITH COOLING PUMP

(75) Inventors: Jason E. Moore, Clarkston, MI (US); Frederick E. Zink, Capac, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 493 days.

(21) Appl. No.: 10/776,925

(22) Filed: Feb. 11, 2004

(65) Prior Publication Data

US 2005/0173973 A1 Aug. 11, 2005

(51) Int. Cl.
*B60K 17/00* (2006.01)

(52) U.S. Cl. .................. 180/339; 180/378; 475/161

(58) Field of Classification Search ............. 180/339, 180/378; 475/161, 222; 184/104.1
See application file for complete search history.

(56) References Cited

U.S. PATENT DOCUMENTS

| | | | | |
|---|---|---|---|---|
| 2,276,404 | A | * | 3/1942 | Lundquist .................. 416/179 |
| 2,320,663 | A | * | 6/1943 | Schultz ...................... 416/179 |
| 4,340,014 | A | * | 7/1982 | Kirchweger ............. 123/41.63 |
| 4,384,824 | A | * | 5/1983 | Woods ..................... 416/169 A |
| 4,493,677 | A | | 1/1985 | Ikenoya |
| 4,692,053 | A | * | 9/1987 | Sampedro ................... 403/24 |
| 4,848,453 | A | | 7/1989 | Evans |
| 5,191,813 | A | | 3/1993 | Havens |
| 5,513,893 | A | | 5/1996 | Nakata et al. |
| 5,622,051 | A | | 4/1997 | Iida et al. |
| 5,839,327 | A | | 11/1998 | Gage |
| 5,927,384 | A | | 7/1999 | Waldner, Jr. |
| 5,931,218 | A | * | 8/1999 | Carlson et al. ............... 165/47 |
| 6,036,615 | A | | 3/2000 | Young et al. |
| 6,053,838 | A | | 4/2000 | Gage |
| 6,155,135 | A | | 12/2000 | Gage et al. |
| 6,325,737 | B1 | | 12/2001 | Zinke et al. |
| 6,343,471 | B1 | | 2/2002 | Thoma et al. |
| 6,358,010 | B2 | * | 3/2002 | Light et al. ............. 416/169 A |
| 6,432,018 | B1 | | 8/2002 | Morse et al. |

OTHER PUBLICATIONS

"An External Investigation of NACA Submerged-Duct Entrances" NACA Library, Oct. 1945.

* cited by examiner

*Primary Examiner*—Paul N. Dickson
*Assistant Examiner*—Toan C. To
(74) *Attorney, Agent, or Firm*—Harness, Dickey & Pierce, P.L.C.

(57) ABSTRACT

An axle assembly with a cooling pump. The cooling pump includes a disk-shaped wheel with a plurality of radially-spaced ducts formed therein. The wheel is positioned in proximity to the axle assembly and rotated, allowing the ducts to draw air therethrough and direct the air to the axle assembly.

27 Claims, 5 Drawing Sheets

AXLE ASSEMBLY WITH COOLING PUMP

BACKGROUND OF THE INVENTION

The present invention generally relates to driveline power transfer mechanisms and more particularly, to driveline power transfer mechanisms that include a cooling system.

Modern vehicles typically include an axle assembly having a housing and a differential assembly. The housing includes a cavity into which the differential assembly is rotatably disposed. The differential assembly is mechanically coupled to the vehicle's engine by a drive shaft. The differential assembly is also coupled to the vehicle drive wheels via a pair of axle shafts. The differential assembly regulates the drive torque between the axle shafts thereby causing the shafts to rotate. During operation of the vehicle, friction between the various components of the differential assembly generates heat, which if unabated could decrease the useful life of the axle assembly. A lubricating fluid, which is contained within the cavity of the axle assembly is therefore typically employed to remove heat from the various components of the differential assembly. The lubricating fluid then rejects, or transfers, this heat to the housing, which, in turn, rejects or transfers this heat via convection, conduction, and radiation to the environment in which the vehicle is operating.

Current advances in the fuel efficiency of vehicles have resulted in decreased air flow under the vehicle, which significantly reduces the capability of the housing of the axle assembly to reject heat.

One solution that has been suggested utilizes a dedicated heat exchanger for removing heat from the housing of the axle assembly. Several drawbacks have been noted with this approach, however. For example, the viscosity of the lubricating fluids in an axle assembly is such that the lubricating fluid is relatively difficult to pump, particularly when the ambient air temperature is relatively low. Another drawback concerns the cost of the pumps and heat exchangers used in these systems.

In view of the aforementioned drawbacks, there remains a need in the art for an axle assembly having a cooling system that provides improved cooling of the axle lubricant and axle assembly components.

SUMMARY OF THE INVENTION

In one form, the present teachings provide a vehicle driveline component that includes a housing, a power transfer mechanism and a wheel. The housing defines a chamber. The power transfer mechanism has a shaft that is supported for rotation by the housing and which extends outwardly from the housing. The wheel is coupled to the shaft for rotation therewith. The wheel includes a leading surface and a trailing surface and defines a duct that extends through the leading surface and the trailing surface. The duct is configured to draw air therethrough when the wheel is rotated.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims taken in conjunction with the accompanying drawings wherein:

DETAILED DESCRIPTION OF THE PREFERRED EMBODIMENTS

The following description of the illustrated embodiment is merely exemplary in nature and is in no way intended to limit the disclosure, its application, or uses. drivetrain Although the particular vehicle driveline component described herein and illustrated in the attached drawings is an axle assembly, those of ordinary skill in the art will appreciate that the disclosure, in its broadest aspects, has applicability to various other types of vehicle driveline components.

Figure 1:
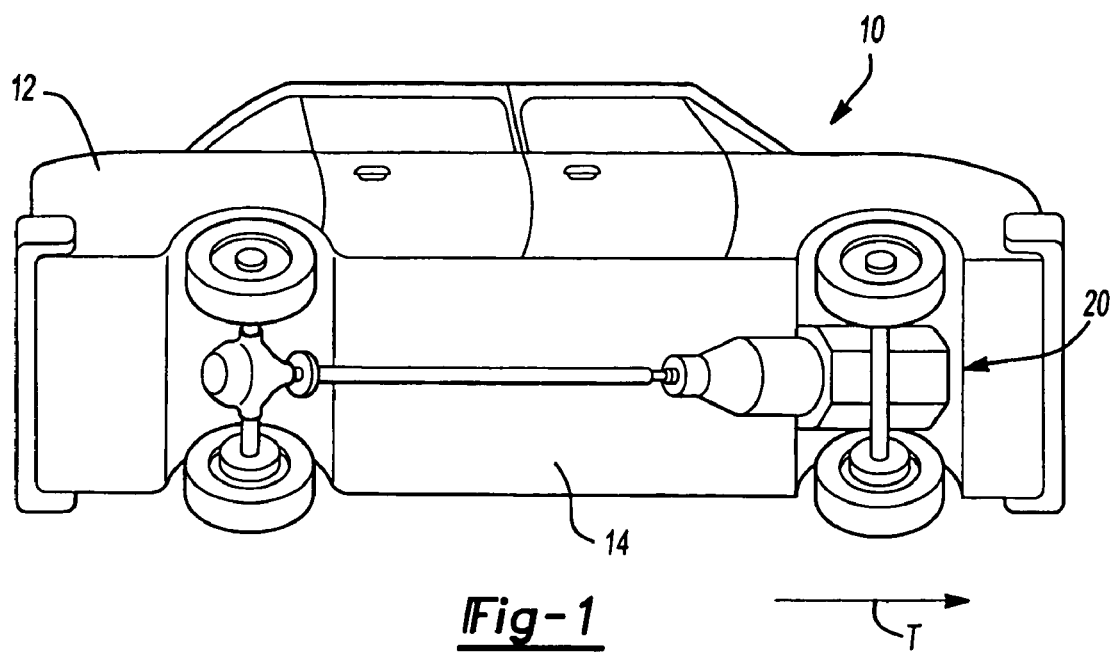
FIG. 1 is a perspective view of an exemplary motor vehicle into which the axle assembly constructed in accordance with the teachings of the present invention is incorporated.
Figure 2:
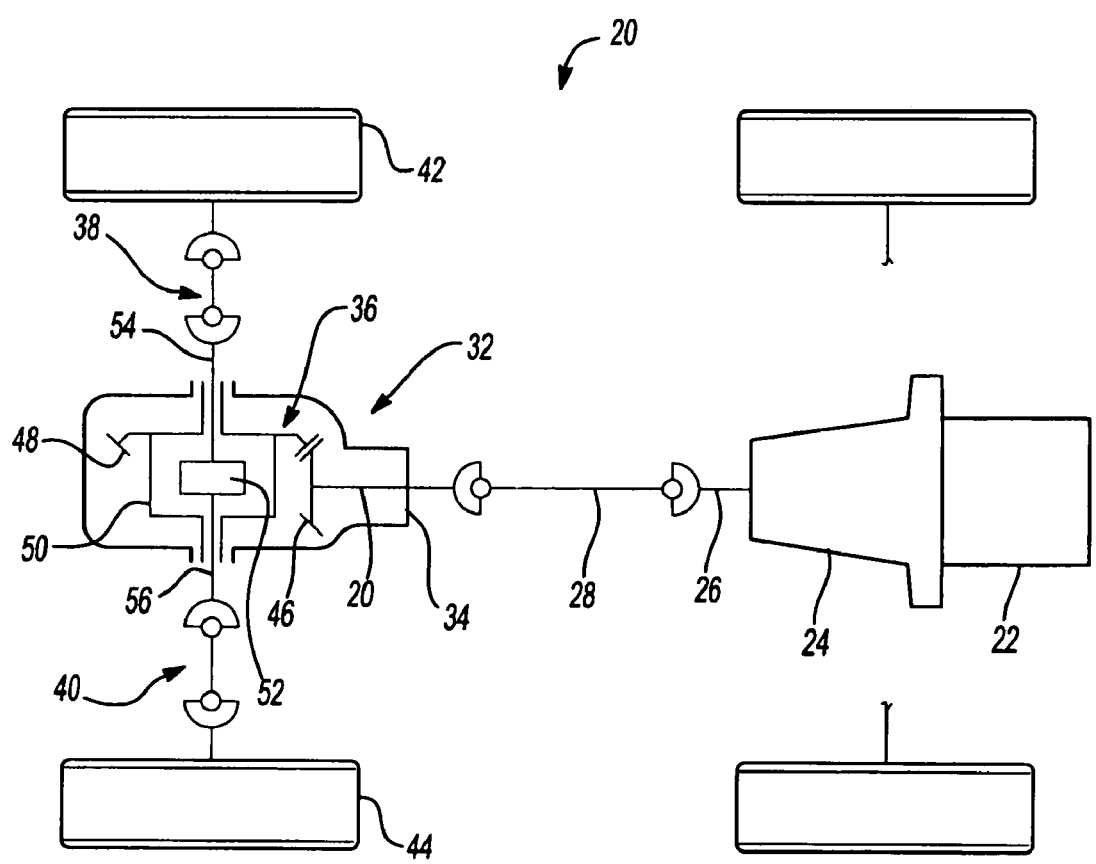
FIG. 2 is a schematic view of the drivetrain of the motor vehicle of FIG. 1.

With particular reference now to FIG. 1, an exemplary motor vehicle is generally indicated by the reference numeral 10. Vehicle 10 can include a body 12, an underbody 14, and a drivetrain 20. Referring now to FIG. 2, drivetrain 20 can include an engine 22, a transmission 24, which has an output shaft 26, and a propeller shaft 28 that can connect output shaft 26 to a pinion shaft 30 of a rear axle assembly 32. Rear axle assembly 32 includes an axle housing 34, a differential assembly 36, which is supported in axle housing 34, and a pair of axle shafts 38 and 40, respectively that are interconnected to left and right rear wheels 42 and 44, respectively. Pinion shaft 30 has a pinion shaft gear 46 fixed thereto which drives a ring gear 48 that is fixed to a differential casing 50 of differential assembly 36. A gear set 52 supported within differential casing 50 transfers rotary power from differential casing 50 to output shafts 54 and 56 connected to axle shafts 38 and 40, respectively, and facilitates relative rotation therebetween. While differential assembly 36 is shown in a rear wheel drive application, it is contemplated that the teachings of the present disclosure can be employed with other vehicle driveline components, including differential assemblies installed in transaxles for use in front wheel drive vehicles and/or in transfer cases for use with four wheel drive vehicles.

Figure 3:
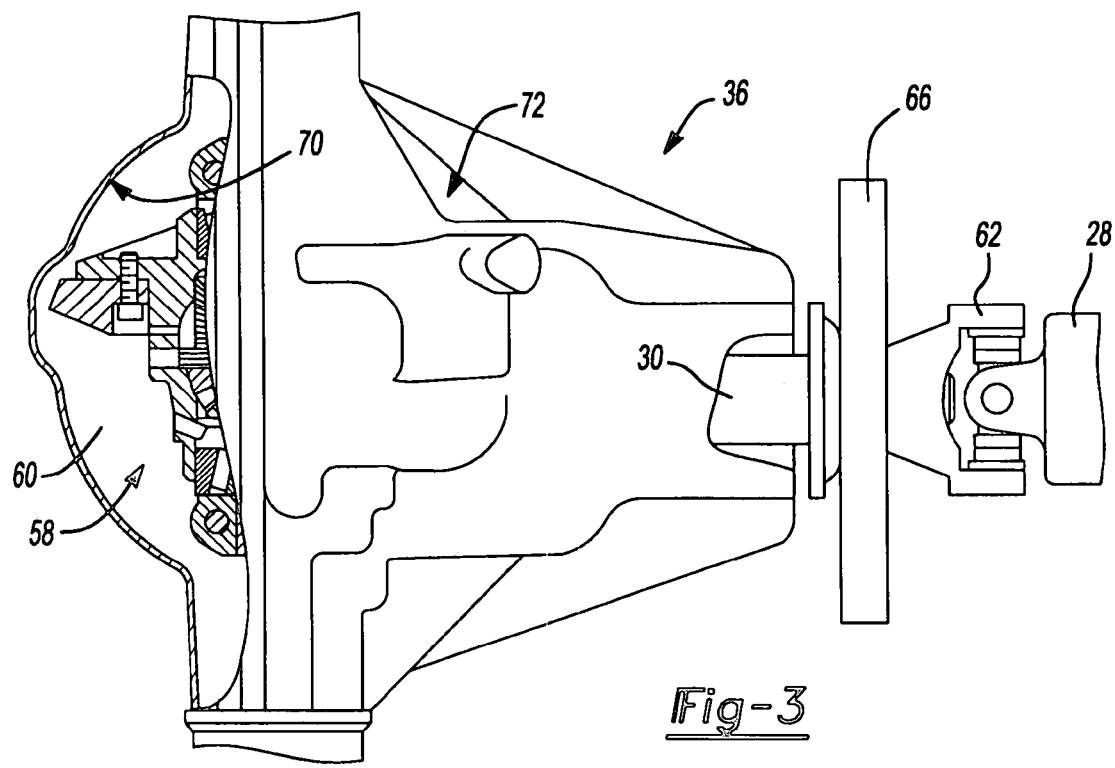
FIG. 3 is a plan view of the differential portion of an axle assembly of the drivetrain in FIG. 2.
Figure 4:
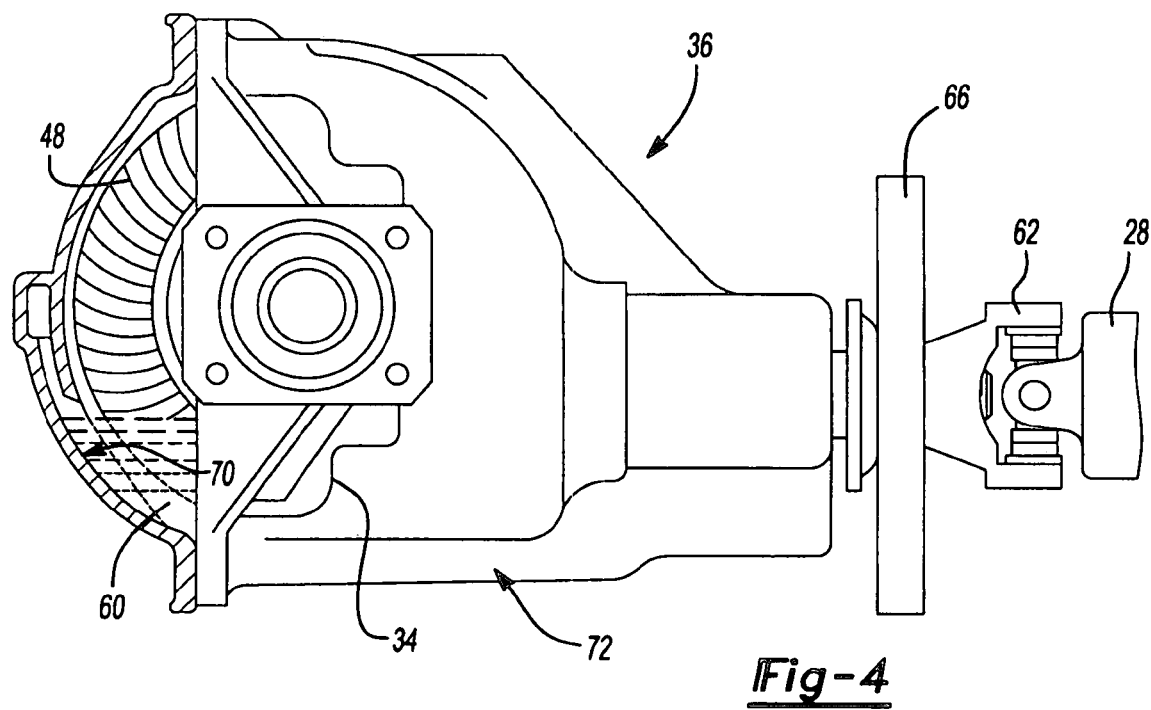
FIG. 4 is a side view of the differential of FIG. 3.

Referring now to FIGS. 3 and 4, axle assembly 32 is described in detail. Differential assembly 36 is a parallel axle type differential that includes an axle housing 34 that defines an internal chamber 58 with a lubricating fluid 60 contained therein. Pinion shaft 30 connects to propeller shaft 28 via a yoke 62 that is operably connected to pinion shaft 30 for rotation therewith. A wheel 66 is interposed between differential assembly 36 and yoke 62 such that wheel 66 is coupled for rotation with yoke 62 and pinion shaft 30. In the particular example provided, wheel 66 is bolted to pinion shaft 30 and yoke 62, but those skilled in the art will appreciate that wheel 66 could be coupled to pinion shaft 30 and/or yoke 62 in any appropriate manner. Axle housing 34 includes an inside surface 70 and an outside surface 72. Lubricating fluid 60 is in contact with ring gear 48 and gearset 52 and receives heat therefrom. Lubricating fluid 60 is in contact with inside surface 70 of axle housing 34 for transfer of heat thereto.

During operation of vehicle 10 the internal moving components of axle assembly 32, including gearset 52, pinion shaft gear 46, and ring gear 48, produce heat. This heat is transferred to lubricating fluid 60 and then transferred to axle housing 34, via inside surface 70, and then out of axle housing 34 through outside surface 72. The amount of heat removed from outside surface 72 depends upon the volumetric airflow across axle housing 34. As vehicle 10 is moving, airflow across outside surface 72 results in forced air convection, which can be supplemented with the air supplied by wheel 66, as discussed below. While axle housing 34 is shown to include a smooth outer outside surface 72, it will be appreciated that outside surface 72 could be provided with fins that could add to the structural stiffness and/or heat dissipation capability of outside surface 72.

Figure 5:
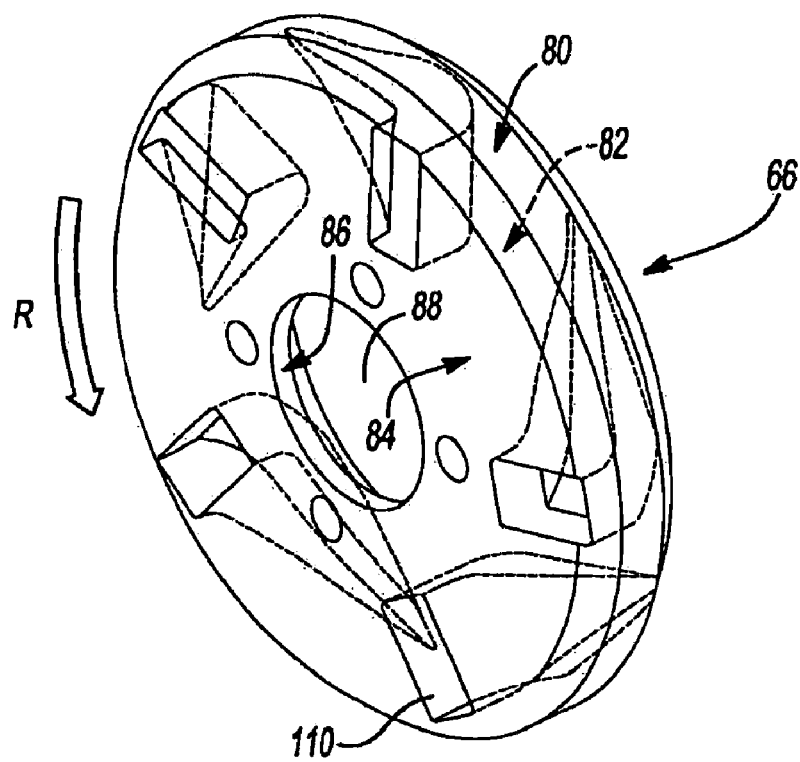
FIG. 5 is a perspective view of the wheel shown in FIG. 3.
Figure 6:
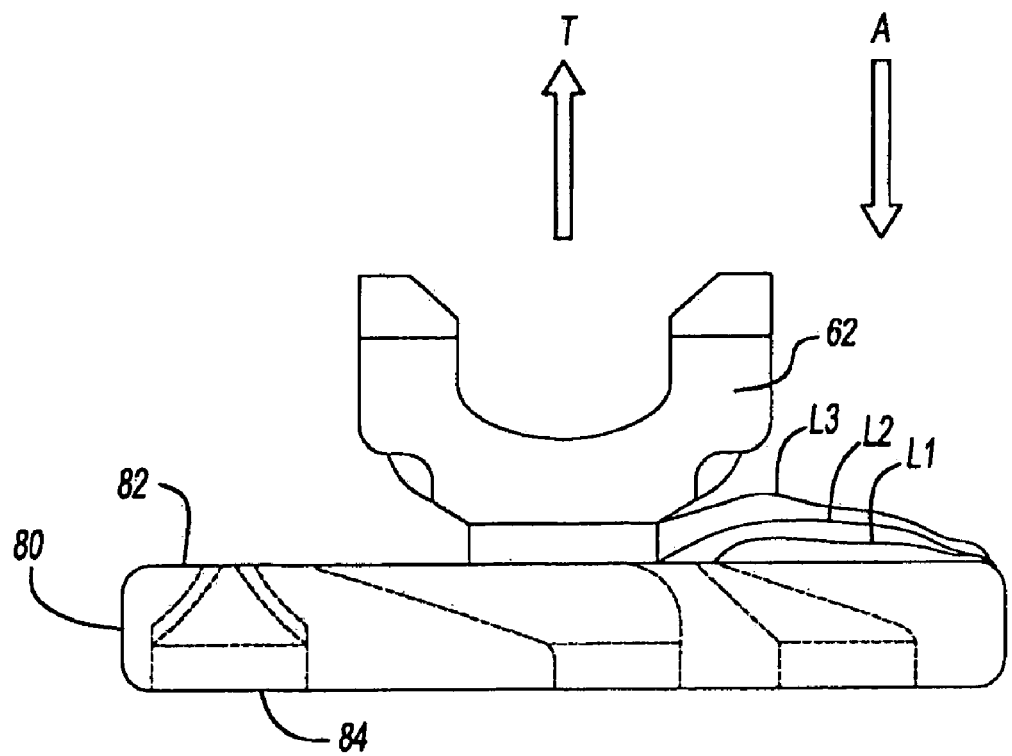
FIG. 6 is a side view of the wheel of FIG. 5.
Figure 7:
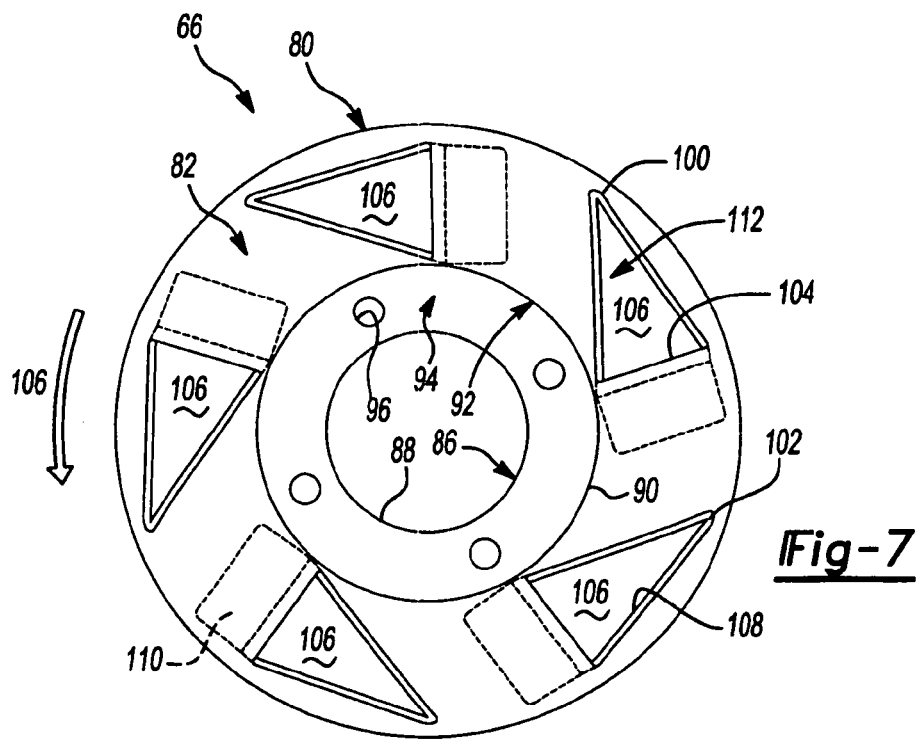
FIG. 7 is a front view of the wheel of FIG. 5.

With reference now to FIGS. 5–7, wheel 66 is described in greater detail. Wheel 66 is shown to include a cylindrical outer surface 80, an annular leading surface 82, an annular trailing surface 84 and an inner cylindrical surface 86 defining a central bore 88. As best seen in FIG. 7, wheel 66 further includes a partial cylindrical bore 90 that intersects leading surface 82 and forms a recessed cylindrical surface 92 and a recessed annular surface 94. Mounting apertures 96 are formed within wheel 66 from recessed annular surface 94 to trailing surface 84. Mounting apertures 96 are provided for attachment of wheel 66 to yoke 62 and/or pinion shaft 30.

Wheel 66 is further shown to include at least one duct 100 formed therein. Duct 100 can be defined by a leading edge 102, a lip 104, a ramp 106, ramp walls 108, and an outlet 110. Outlet 110 defines an aperture within trailing surface 84. Leading edge 102, lip 104, and ramp walls 108 intersect leading surface 82 to define an opening 112. While outer surface 80 is illustrated as a cylindrical surface, it would be appreciated that outer surface 80 could be other shapes, such as frusto-conical or a plurality of intersecting polygons, depending upon the relative geometry of leading surface 82 and trailing surface 84.

Duct 100 is shown in FIGS. 5–7 to be a variable area duct such as detailed in National Advisory Committee for Aeronautics (NACA), Advance Confidential Report 5I20 of Nov. 13, 1945, declassified version dated Jul. 3, 1951, "An Experimental Investigation of NACA, Submerged-Duct Entrances." The geometry of duct 100 is formed to allow duct 100 to perform similar to a variable geometry NACA duct as discussed herein.

Figure 8:
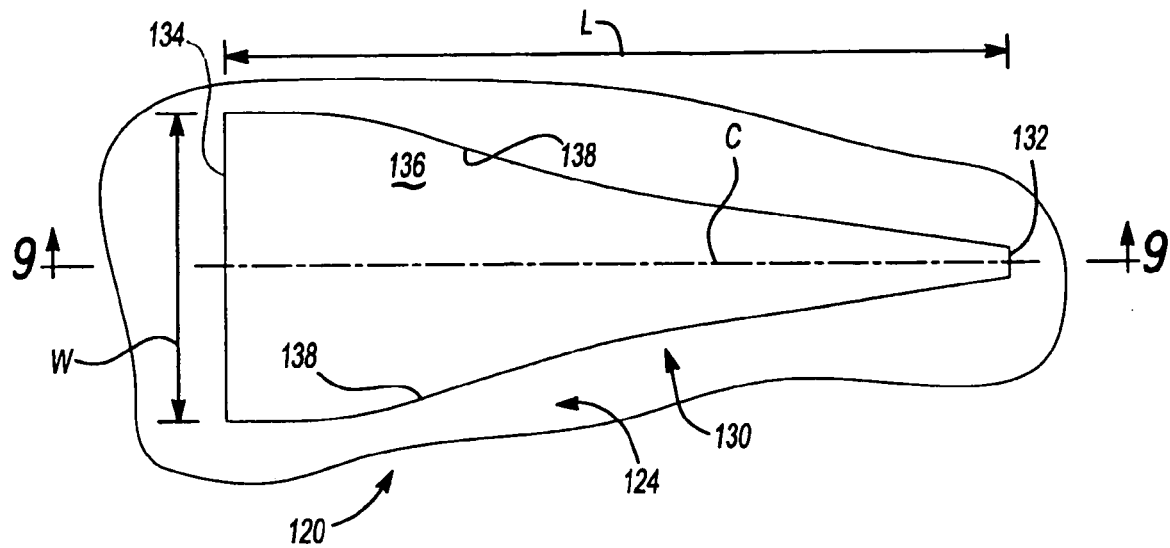
FIG. 8 is a plan view of a conventional duct within a streamline body.
Figure 9:
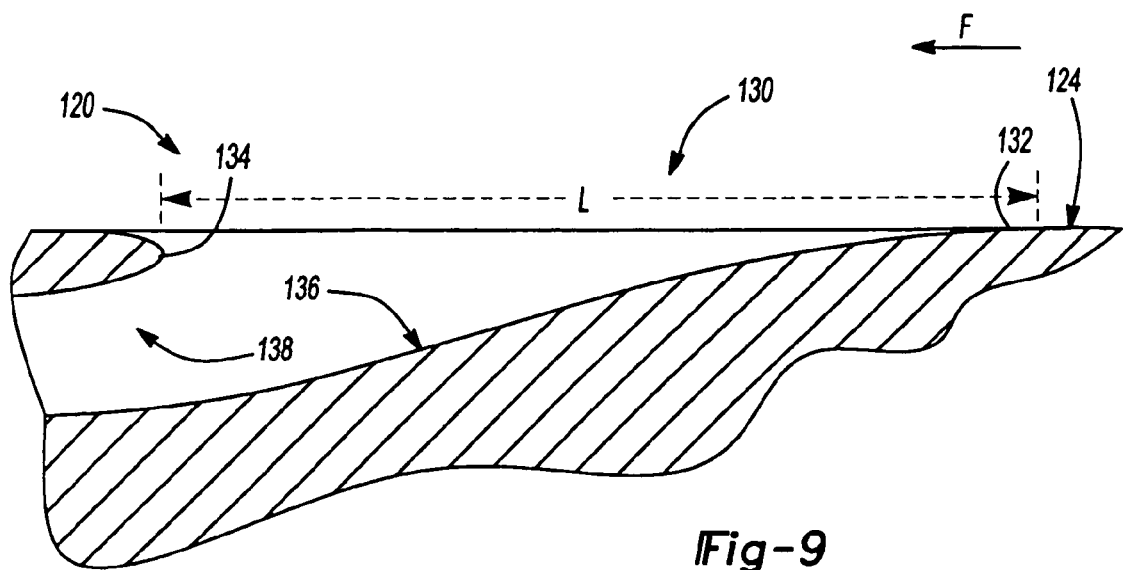
FIG. 9 is a sectional view taken along line 9—9 of FIG. 8.

Referring now to FIGS. 8 and 9, a streamline body 120 is illustrated to include an outer surface 124 with a NACA duct 130 formed therein. NACA duct 130 is defined by a leading edge 132, a lip 134, a ramp 136, a pair of ramp walls 138 and a centerline C. The distance between leading edge 132 and lip 134 along centerline C is illustrated as length L. Lip 134 has a width W. Ramp walls 138 and ramp 136 are formed to converge as they approach lip 134. Thus formed, the cross-sectional area of duct 130 taken normal to centerline C increases from leading edge 132 to lip 134.

Laminar air flow in the direction of arrow F across streamline body 120 creates a boundary layer of air immediately adjacent streamline body 120. As the boundary layer encounters the leading edge 132 of NACA duct 130, the flow area available to the boundary layer increases. This increase in flow area provides a localized reduction in air pressure within the boundary layer. As the boundary layer continues to flow along the length L of the NACA duct 130 from the leading edge 132 to the lip 134, the curvature of the ramp walls 138 and the angle of the ramp 136 relative to the outer surface 124 of the streamline body 120 create a further increase in flow area available to the boundary layer of air and a resulting further decrease in localized air pressure within the boundary layer. This decreased localized air pressure zone is defined by the air within the duct and immediately adjacent the duct opening. This decrease in air pressure results in an increase in air velocity. The resulting low pressure acts to draw or suck air into the duct opening formed in the outer surface 124 by creating a vacuum effect. The air drawn into duct 130 is then directed to a preselected air intake, such as an engine intake or cooling surface.

The vacuum effect does not impart a significant amount of turbulence in the boundary layer. In contrast, an air scoop that is positioned into the path of the boundary layer will divert air into an opening in a surface of a streamline body by pushing the air into the surface opening. This pushing of air, however, creates a reactive force within the scoop and creates drag in the boundary layer as turbulence is imparted to the boundary layer downstream of the scoop along the streamline body. Thus provided, a conventional NACA duct 130 draws in a portion of air from a boundary layer as the boundary layer of air passes the opening of the NACA duct 130, thus diverting air with negligible turbulence. The present invention utilizes this vacuum creating effect to suck air into ducts 100, as described below. As illustrated, NACA duct 130 is symmetrical along centerline C, although it will be appreciated by one skilled in the art that a duct need not be symmetrical to operate in the manner described above.

As best seen in FIGS. 5 and 6, the direction of travel, as indicated by arrow T, of vehicle 10 provides a resultant airflow generally in the direction of arrow A. This airflow impacts leading surface 82 and builds a resulting air pressure gradient along leading surface 82 with a higher pressure found adjacent leading surface 82. Layers of air adjacent leading surface 82 are represented as L1, L2, and L3, wherein the air pressure within layer L1 is greater that the air pressure within layer L2, and the air pressure within layer L2 is greater that the air pressure within layer L3. Travel of vehicle 10 in direction T also results in rotation of wheel 66 in the direction shown in FIG. 5. As best seen in FIGS. 5 and 7, duct 100 is formed in wheel 66 such that leading edge 102 is followed by lip 104 as wheel 66 rotates in the direction of arrow R. As wheel 66 rotates, ducts 100 create locations of localized low pressure within openings 112, in the same manner as discussed above with reference to the operation of a NACA duct 130. These locations of localized low pressure pull air from layer L1 into openings 112. Rotation of wheel 66 allows ducts 100 to draw in air which is expelled through outlets 110 and onto outside surface 72 of axle housing 34. This decrease in pressure within ducts 100 results in an increase in velocity for a gas such as air. This increase in velocity of air provides for a larger volumetric air flow directed to exterior surface 72 of axle housing 34 thereby providing a greater amount of heat dissipation from axle assembly 32. Further travel of vehicle 10 causes further rotation of wheel 66 and additional air to encounter leading surface 82. This further rotation of wheel 66 draws the additional air into ducts 100. Thus provided, wheel 66 provides a device useful to draw air and increase the velocity of the air to provide a greater cooling capacity to an existing assembly.

Figure 10:
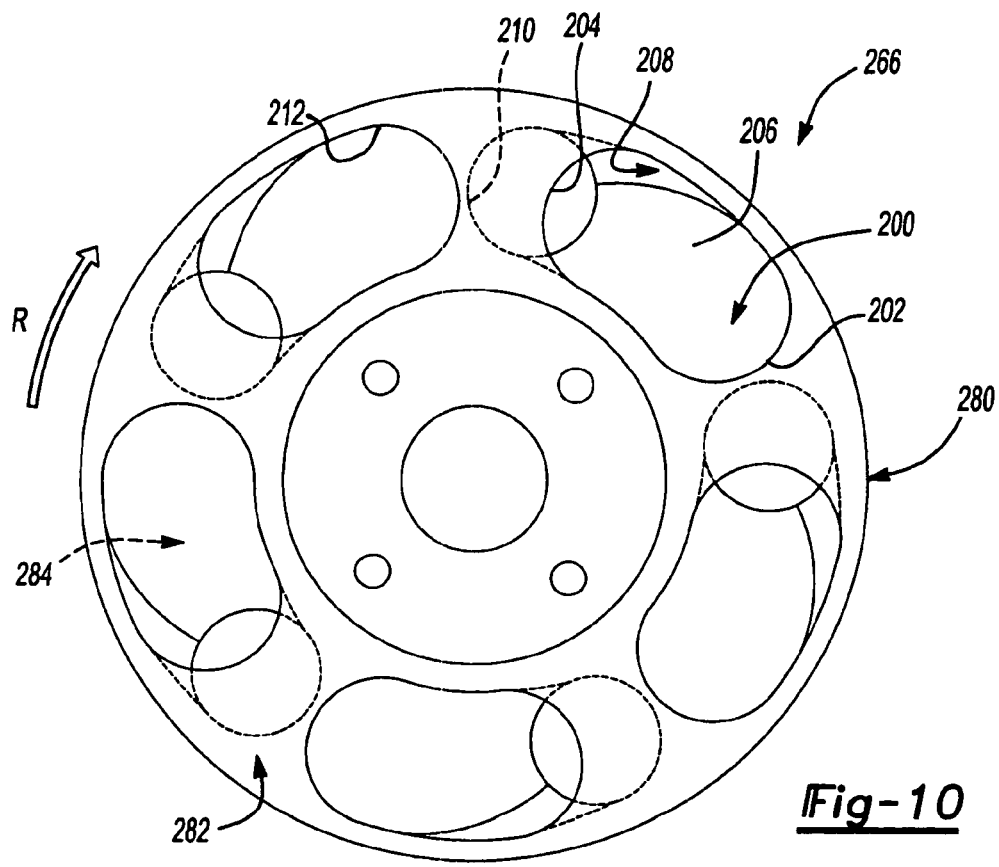
FIG. 10 is an alternate embodiment of the wheel of FIG. 5.

Referring now to FIG. 10, an alternate embodiment of wheel 66 is shown as an wheel 266 including a plurality of ducts 200, a cylindrical outer surface 280, an annular leading surface 282, and an annular trailing surface 284. Each duct 200 is defined by a leading edge 202, a lip 204, a ramp 206, ramp walls 208, and an outlet 210 that intersects trailing surface 284. Leading edge 202, lip 204, and ramp walls 208 intersect leading surface 282 to define an opening 212. Opening 212 has a generally oval cross section and ramp 206 is curved and integral with ramp walls 208. Wheel 266 operates in a manner similar to wheel 66 as discussed herein.

While ducts 100, 130 and 200 are illustrated with specific geometries, it would be appreciated by one skilled in the art that a duct of any other geometry within an wheel that is designed to draw air into the duct from an adjacent air layer could be utilized to produce a similar result.

The description of the invention is merely exemplary in nature and, thus, variations that do not depart from the gist of the invention are intended to be within the scope of the invention. Such variations are not to be regarded as a departure from the spirit and scope of the invention.

The curvature of ramp walls 138 relative the centerline C of NACA duct 130 is represented in Table 1 wherein the relationship between a distance x along centerline C from lip 134 and a corresponding distance y is tabulated. Distance y is the distance from the centerline C at distance x to the ramp walls 138.

TABLE 1

| x/L | y/B |
|---|---|
| 0.0 | 0.500 |
| 0.05 | 0.4930 |
| 0.10 | 0.4670 |
| 0.20 | 0.3870 |
| 0.30 | 0.3100 |
| 0.40 | 0.2420 |
| 0.50 | 0.1950 |
| 0.60 | 0.1550 |
| 0.70 | 0.1200 |
| 0.80 | 0.0750 |
| 0.90 | 0.0575 |
| 1.00 | 0.0440 |

What is claimed is:

1. A vehicle driveline component comprising:
   a housing defining a chamber;
   a power transfer mechanism having a shaft, the shaft being supported for rotation by the housing and extending outwardly from the housing; and
   a wheel coupled to the shaft for rotation therewith, the wheel including a leading surface and a trailing surface, the wheel defining a duct that extends through the leading surface and the trailing surface, the duct having an inlet at the leading surface and an outlet at the trailing surface with a cross-sectional area of the inlet greater than a cross-sectional area of the outlet, the duct being adapted to draw air therethrough when the wheel is rotated.

2. The vehicle driveline component of claim 1, wherein the power transfer mechanism includes a differential.

3. The vehicle driveline component of claim 2, wherein the shaft is an input pinion.

4. The vehicle driveline component of claim 1, wherein the inlet of the duct has a generally triangular shape.

5. The vehicle driveline component of claim 4, wherein the outlet of the duct has a generally rectangular shape.

6. The vehicle driveline component of claim 1, wherein the duct includes an inlet that is located at the leading surface and wherein the inlet has a generally oval shape.

7. The vehicle driveline component of claim 6, wherein the duct includes an outlet that is located at the trailing surface and wherein the outlet has a generally circular shape.

8. The vehicle driveline component of claim 1, wherein the wheel includes an outer peripheral surface and wherein the duct lies radially inward of the outer peripheral surface.

9. The vehicle driveline component of claim 1, wherein the wheel is disk shaped.

10. A vehicle driveline component comprising:
    an axle housing defining a chamber;
    a differential mounted to the housing for rotation in the chamber about a first axis, the differential including a ring gear;
    an input pinion shaft mounted to the housing for rotation about a second axis that is generally perpendicular to the first axis, the input pinion shaft including a pinion gear, which is meshingly engaged to the ring gear, and a shaft member that extends from the housing;
    a yoke member coupled to the shaft member, the yoke member being adapted for coupling the input pinion shaft to a propeller shaft; and
    a wheel that is coupled for rotation with the shaft member and disposed between the pinion gear and the yoke member, the wheel including a leading surface and a trailing surface, the wheel defining a duct that extends through the leading surface and the trailing surface, the duct being adapted to draw air therethrough when the wheel is rotated.

11. The vehicle driveline component of claim 10, wherein the duct includes an inlet at the leading surface and an outlet at the trailing surface and wherein a cross-sectional area of the inlet is greater than a cross-sectional area of the outlet.

12. The vehicle driveline component of claim 10, wherein the duct includes an inlet at the leading surface and an outlet at the trailing surface and wherein a cross-sectional area of the duct varies continuously between the inlet and the outlet.

13. The vehicle driveline component of claim 10, wherein the duct is symmetric about a duct centerline.

14. The vehicle driveline component of claim 10, wherein the wheel includes an outer peripheral surface and wherein the duct lies radially inward of the outer peripheral surface.

15. The vehicle driveline component of claim 10, wherein the duct includes an inlet at the leading surface, the inlet being disposed in a plane that is generally perpendicular to the second axis.

16. The vehicle driveline component of claim 10, wherein the duct includes an outlet at the trailing surface, the outlet being disposed in a plane that is generally perpendicular to the second axis.

17. A vehicle driveline component comprising:
    a housing defining a chamber;
    a power transfer mechanism having a ring gear supported in the chamber for rotation about a first axis, a pinion gear meshed with the ring gear and supported in the chamber for rotation about a second axis, and a shaft fixed for rotation with the pinion gear that extends from the housing:
    a yoke member coupled to the shaft and adapted for connection to a propeller shaft; and
    a wheel fixed for rotation with the shaft and disposed between the housing and the yoke member, the wheel defining a leading surface and a trailing surface with a duct extending therebetween that is adapted to draw air therethrough when the wheel is rotated.

18. The vehicle driveline component of claim 17, wherein the duct includes an inlet at the leading surface and an outlet at the trailing surface and wherein a cross-sectional area of the inlet is greater than a cross-sectional area of the outlet.

19. The vehicle driveline component of claim 17, wherein the duct includes an inlet at the leading surface and an outlet at the trailing surface and wherein a cross-sectional area of the duct varies continuously between the inlet and the outlet.

20. The vehicle driveline component of claim 17, wherein the duct is symmetric about a duct centerline.

21. The vehicle driveline component of claim 17, wherein the wheel includes an outer peripheral surface and wherein the duct lies radially inward of the outer peripheral surface.

22. The vehicle driveline component of claim 17, wherein the duct includes an inlet at the leading surface, the inlet being disposed in a plane that is generally perpendicular to the second axis.

23. The vehicle driveline component of claim 17, wherein the duct includes an outlet at the trailing surface, the outlet being disposed in a plane that is generally perpendicular to the second axis.

24. A vehicle driveline component, comprising:
a housing defining a chamber;
a power transfer mechanism having a pinion shaft with a pinion gear supported for rotation within the chamber and a shaft member extending outwardly from the housing;
a yoke member coupled to the shaft member; and
a wheel fixed for common rotation with the shaft member and disposed between the housing and the yoke member, the wheel including a leading surface and a trailing surface with a duct extending therebetween such that the duct draws air toward the housing when the wheel is rotated.

25. The vehicle driveline component of claim 24, wherein the duct includes an inlet at the leading surface and an outlet at the trailing surface and wherein a cross-sectional area of the inlet is greater than a cross-sectional area of the outlet.

26. The vehicle driveline component of claim 24, wherein the duct includes an inlet at the leading surface and an outlet at the trailing surface and wherein a cross-sectional area of the duct varies continuously between the inlet and the outlet.

27. The vehicle driveline component of claim 24, wherein the duct is symmetric about a duct centerline.

* * * * *